United States Patent
Ohsuga

(10) Patent No.: US 7,123,829 B2
(45) Date of Patent: Oct. 17, 2006

(54) DIGITAL CAMERA AND POWER SUPPLY APPARATUS USED THEREFOR

(75) Inventor: Jun Ohsuga, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 180 days.

(21) Appl. No.: 10/916,474

(22) Filed: Aug. 12, 2004

(65) Prior Publication Data
US 2005/0062879 A1    Mar. 24, 2005

(30) Foreign Application Priority Data
Aug. 29, 2003 (JP) ............................. 2003-307544
Sep. 19, 2003 (JP) ............................. 2003-329086

(51) Int. Cl.
G03B 7/26 (2006.01)
G05F 1/10 (2006.01)
H02J 1/00 (2006.01)
H02H 7/00 (2006.01)

(52) U.S. Cl. ..................... 396/301; 323/220; 307/11; 307/41; 307/135; 361/18

(58) Field of Classification Search ............... 396/301, 396/303; 323/220; 307/11, 34, 38–41; 361/18
See application file for complete search history.

(56) References Cited

U.S. PATENT DOCUMENTS 6,252,567 B1 *  6/2001  Budzelaar ................ 345/55
6,351,611 B1 *  2/2002  Nonaka .................... 396/203

FOREIGN PATENT DOCUMENTS

| JP | 6-119074 | 4/1994 |
| JP | 2794631 | 6/1998 |
| JP | 2001-208956 | 8/2001 |

* cited by examiner

Primary Examiner—W. B. Perkey
(74) Attorney, Agent, or Firm—Oblon, Spivak, McClelland, Maier & Neustadt, P.C.

(57) ABSTRACT

A digital camera, including a common power supply for supplying power; a plurality of motors sharing the power supply and driven by the power supplied from the power supply; and a current detector for detecting load current supplied to the plurality of motors, wherein, when either one of the plurality of motors is operated, other motor is driven not to overlap with a maximum value of the load current detected by the current detector.

19 Claims, 8 Drawing Sheets

DIGITAL CAMERA AND POWER SUPPLY APPARATUS USED THEREFOR

BACKGROUND OF THE INVENTION

1. Field of the Invention

The present invention relates to a digital camera and a power supply apparatus suitable therefor.

2. Description of the Related Art

Recently, a digital camera has been used often in place of a conventional camera utilizing a film. Additionally, in the digital camera, it has been aimed to allow a lens-barrier motor, a zoom motor and a focus motor and the like to complete their predetermined operation as soon as possible at the time of activation or photographing to reduce the time lag and thereby to enhance user convenience. As one of the ways to accomplish the aim, for example, motor driving power is increased to drive the motor at high speed, or a plurality of motors is driven simultaneously, to achieve reduction of operating time of the camera. As a result, load power at the time of operation of the motor is increased and hence a large load is applied to a power supply.

As conventional technique to reduce such load in the power supply, JP-A 2001-208956 discloses a digital camera capable of adjusting the time required for starting-up thereof corresponding to capacity of a power supply currently used. According to this conventional technique, it discloses the technique in which the capacity and kind of the power supply are judged on the basis of a voltage value of the power supply inputted through a bus to control the driving of a DC motor as a motor for zooming and a stepping motor as a motor for focus in accordance with the capacity and the kind of the power supply judged.

However, as well as in the conventional technique disclosed in the above mentioned JP-A 2001-208956, there are many portions in the digital camera that require large load power such as a DSP (Digital Signal Processor) and a memory, other than the load power for the motor. Accordingly, in the digital camera in which same power source is used with respect to those portions, there is a possibility that power supply voltage drops by increase in the load power of the motor and thereby operation of the digital camera itself cannot be carried out. Even if the digital camera is barely operated in such case, the problem occurs that the life of battery is shortened in a case where a battery is used as the power supply.

Also, as disclosed in Japanese Patent No. 2794631, measures have been taken in which, when driving the plurality of motors simultaneously, each load current is reduced so as not to increase the load power. However, this makes a period of operating the motor long.

Meanwhile, there are three reasons for generation of a voltage variation in the power supply due to load fluctuation, first, for lack of supply capacity of the power supply, second, for lack of conversion capacity of a power conversion circuit in the power supply, and third, for too much loads. Among these reasons, it can be said that the lack of capacity of the power conversion circuit is the major technological issue with respect to the power supply.

The power conversion circuit constantly monitors output voltage, and operates in such a manner as to increases supply of power when the load is increased and decreases the supply of power when the load is decreased. However, in the rapid change of the load, for example if the load is increased drastically, the output voltage falls since the power cannot be supplied sufficiently, whereas if the load is decreased drastically, the output voltage rises due to excessive supplying of power. There are methods to change oscillation cycle and change duty of ON/OFF oscillation, in order to correspond to the drastic load fluctuation. However, there is a limitation in terms of software and hardware to allow the oscillation cycle to be faster, and 100% is the limitation to make "ON-duty" to be longer in the changing of the duty, thus the fall of the output voltage cannot be suppressed at some point. Therefore, it can be said that the operational limitation in terms of the software and the hardware is the limitation of the capacity in the power conversion circuit.

As conventional technique for the power supply, JP-A H6-119074 discloses the technique for reducing a variation in output voltage and a variation in input voltage caused by the load fluctuation. According to this conventional technique, a conventional power supply apparatus is combined with a flow diverter and an alternating current detecting circuit to construct a power supply apparatus. The variation in output current flowing through a load is detected by the alternating current detecting circuit, while the alternating current detecting circuit outputs an output signal which complies with the load fluctuation to the flow diverter. The flow diverter changes amplitude of the output signal in accordance with the output signal from the alternating current detecting circuit to divert current to be supplied from the power supply apparatus to the load.

In order to correspond to such voltage variation, the conventional power supply apparatus provided with the power conversion circuit uses a large capacity of condenser for the output or accelerates a response of feedback of the output as a way to suppress the voltage variation caused by the load fluctuation. However, use of the large capacity of condenser causes various adverse effects to generate such as increase of rush current, delay in rising and falling, rise in cost and increase in mounting spaces. In addition, there is a limitation to make the response of the feedback of the output faster, and even if the acceleration of the response in the feedback of the output is obtained, there is a problem that power consumption increases significantly because the response is accelerated.

Also, since the conventional technique disclosed in the above mentioned JP-A H6-119074 is the technique which carries out the feedback by regarding that the degree which the load fluctuates is the alternating current-like variation, and there is the limitation in order to accelerate the response in the feedback of the output, it also has the problem similar to the above described conventional technique.

SUMMARY OF THE INVENTION

The present invention has been made in view of the above mentioned problems. Therefore, it is a first object of the present invention to provide a digital camera capable of eliminating a factor that interferes with operation of a camera, shortens the life of battery or hinders power saving and enhancing user convenience.

In addition, it is a second object of the present invention to provide a power supply apparatus suitable for the above digital camera which is low in cost and capable of achieving reduction of space and reducing a voltage variation by power saving, without undermining an electrical characteristic.

To solve the above mentioned problems, the present invention provides a power supply apparatus, comprising: a power supply for supplying power to a plurality of devices or circuits to operate the plurality of devices or circuits; and a moderation mechanism for controlling the power supplied to the plurality of devices or circuits, wherein the moderation mechanism controls the power supplied to the plurality of devices or circuits such that the plurality of devices or circuits does not operate simultaneously at the time when the plurality of devices or circuits initiates its operation or stops, and also provides a digital camera having the power supply apparatus.

Also, to accomplish the first object, the present invention provides a digital camera, comprising: a common power supply for supplying power; a plurality of motors sharing the power supply and driven by the power supplied from the power supply; and a current detector for detecting load current supplied to the plurality of motors, wherein, when either one of the plurality of motors is operated, other motor is driven not to overlap with a maximum value of the load current detected by the current detector.

A plurality of motors is generally used in a camera. When the motors are driven, drive current corresponding to a load flows to each of the motors. In a case where the power supply is shared by the motors, a total amount of drive current flows out from the power supply if the motors are driven simultaneously. This is equivalent to a case that the load is increased from the viewpoint of the power supply, and thus a burden of the power source becomes increased. In order to prevent such case, the present invention carries out operation to avoid the plurality of motors to operate simultaneously and shift operating time thereof.

According to the present invention, since the plurality of motors are driven by shifting timing of driving thereof, it is possible to avoid the load of the power supply to be increased in the extreme, and thereby to reduce the load of the power supply.

Also, generally there are direct current and pulse motors for the motors used in the camera. In particular, in the direct current motor, largest current flows in the initial stage of driving when it starts up and then the current gradually decreases. Therefore, a characteristic of the current of the direct current motor is previously grasped and the pulse motor is driven after predetermined time has elapsed from the initiation of driving of the direct current motor. Accordingly, overlapping of the large current flowing at the time of start-up of the direct current motor and drive current of the pulse motor is avoided, in order that high current does not flow out from the power supply.

According to the present invention, since the pulse motor is driven after the predetermined time has elapsed from the time of initiation of driving of the direct current motor, it is possible to avoid the overlapping of the large current flowing at the time of start-up of the direct current motor and the drive current of the pulse motor, and thereby to reduce the load of the power supply.

When the current flows to the motor, a voltage-drop occurs by internal impedance of the power supply. More specifically, the voltage-drop is large when the current is large and the voltage-drop is small when the current is small. This phenomenon can be detected by detecting the voltage of the power supply. Therefore, the present invention includes a voltage detector which detects the voltage-drop of the power supply and decides the timing of driving of the pulse motor based on a result of the detection.

According to the present invention, since the timing of driving of the pulse motor is decided based on the result of the detection of the voltage detector, it is possible to follow fluctuation of the load steadily.

In a case where the direct current motor and the pulse motor exist in a mixed manner, the drive current will be doubled if two or more pulse motors are used and they are driven with same timing, although condition of load current varies according to the motor. Therefore, the present invention is capable of avoiding a current value to be doubled by operating the pulse motors intermittently and shifting phases that perform respective intermittent operation of those.

According to the present invention, since the pulse motors are operated intermittently and are driven by shifting the phases that perform the respective intermittent operation, it is possible to drive the pulse motor with a constant drive current and thereby to minimize the load fluctuation from the viewpoint of the power supply.

Power consumption of the power supply is decided by the product of current and time. Accordingly, it is necessary to allow the current value to be as small as possible to shorten the operating time of the motor, in order to use a battery longer. In addition, there is a case in which the motors used in the camera are operated simultaneously. In such case, it is possible to shorten the total operating time of the motors if operation of the motor which is shorter is completed within the operating time of the motor which is longer. Thereby, it is possible to realize the camera in which time required for manipulation is short and user-friendliness is high.

According to the present invention, since the plurality of motors is controlled such that total operating time for driving the plurality of motors becomes shortest, it is possible to realize the camera in which the time required for manipulation is short and the user-friendliness is high.

It has been already mentioned in the foregoing that the power consumption of the power supply is decided by the product of current and time. However, even if the total operating time is made to be shortest, the entire power consumption becomes high if the load current is large. Therefore, the present invention allows the operating time to be minimum as well as a total of the load current.

According to the present invention, since the total operating time for driving the plurality of motors is controlled to be shortest and the total of the load current is controlled to be least, it is possible to realize the camera in which the time required for manipulation is short and the user-friendliness is high, and at the same time, to allow a burden imposed on the power supply to be minimum.

As the power supply of the camera, there are the battery and an AC adapter. In addition, there are primary and secondary batteries for the battery, and there are various kinds with respect to those. Those kinds of power supply have their own features. For example, it is needless to worry about the life of power supply with regard to the AC adapter, but it cannot be taken along. The primary battery is inexpensive, but it is impossible to reuse it since charging cannot be carried out. The secondary battery can be reused since the charging thereof can be carried out, although it is relatively expensive. In other words, if the kind of power supply loaded in the camera can be discriminated, it is possible to select the operation which corresponds to the discriminated kind. Therefore, the present invention includes a discriminator for discriminating the kind of power supply.

According to the present invention, since the timing of driving of each motor is controlled according to the kind of power supply discriminated by the discriminator, it is possible to realize a method of driving the motor in accordance with the kind of power supply and to obtain most suitable operating condition of the camera.

There are loads for the camera other than the motors, which are a display portion and a circuit. A total of those loads become a full-load of the camera from the viewpoint of the power supply. However, it is not necessarily the case that the full-load is always consumed, depending on modes of the camera. More specifically, the load is light at the time of activation of the camera, since an image system and a display system are not in operation at that time.

According to the present invention, since the timing of operating of the digital camera is controlled according to condition of load detected by load-condition detector, the load fluctuation of the power supply becomes virtually constant, thereby it is possible to allow a voltage variation of the power supply to be small and allow the circuit in the camera to operate in a stable manner.

In the battery of the power supply, the volume within the battery changes according to the ambient temperature and hence, a characteristic of the drive current changes. More specifically, the inner volume of the battery reduces when the ambient temperature becomes low, and thereby it becomes impossible to retrieve high current instantaneously out of the battery. Therefore, in such case, it is necessary to create the timing of operation in which the high current does not flow instantaneously. Accordingly, the present invention includes temperature detector, for detecting the ambient temperature of the camera to control the timing of driving of the respective motors in accordance with a result of detection of the ambient temperature.

According to the present invention, since the timing of driving for the respective motors are controlled according to the temperature detected by the temperature detector, it is possible to operate the camera steadily even when surrounding environment has changed.

There are various kinds of modes in the camera such as a normal mode, a power-saving mode and a high-speed mode. In addition, operation carried out in the camera varies depending on the modes. For example, in the high-speed mode, since it is required to operate the plurality of motors simultaneously, a large burden is applied on the power supply and hence it is necessary to avoid maximum current to be overlapped. Therefore, the present invention includes mode-setting device and controls the timing of driving of the motors according to the respective modes.

According to the present invention, since the timing of driving of each of the plurality of motors is controlled according to a mode set by the mode-setting device, it is possible to select the operation which does not apply the burden on the power supply with respect to every mode.

Also, to accomplish the second object, the present invention provides a power supply apparatus, comprising a power conversion circuit which monitors output voltage and controls supply of power according to increase and decrease of a load; a main load as a cause for generation of a voltage variation; at least one artificial load for suppressing the voltage variation caused by the main load; and an artificial load controlling portion for connecting the artificial load to an output system of the power conversion circuit and disconnecting the artificial load from the output system, wherein the artificial load controlling portion connects the at least one artificial load to the output system of the power conversion circuit which is connected with the main load, immediately before the main load operates and immediately after operation of the main load is completed.

The characteristic of the present invention is that the present invention includes the artificial load for suppressing the load fluctuation caused by the main load and the artificial load controlling portion for connecting the artificial load with the main load or disconnecting it from the main load, other than the main load. Generally, a power supply is provided with the power conversion circuit which operates to increase and decrease the supplying of power when the load is fluctuated, in order to maintain the voltage constant. However, it cannot help accepting the load fluctuation at some extent since it is impossible to follow the speed of the load fluctuation. The drastic generation of the load fluctuation has been a major cause thereof. Therefore, the present invention suppresses the load fluctuation caused by the main load, by connecting the artificial load with the main load immediately before the power is supplied to the main load and immediately after the supplying of power is disconnected.

According to the present invention, since the artificial load is connected immediately before the power is supplied to the main load and immediately after the power is disconnected, the fluctuation of the load from the viewpoint of the power supply becomes moderate, and thus consequently, it is possible to suppress the voltage variation caused by the load fluctuation.

What is important here is that, it is on the premise that the artificial load should be smaller in load than the main load. In other words, about half the load of the main load for example is appropriate in order to allow the load fluctuation from the viewpoint of the power supply to be moderate.

According to the present invention, since the artificial load is lighter in load as compared with the main load, it is possible to allow the load fluctuation from the viewpoint of the power supply to be moderate, by connecting the artificial load immediately before the supplying of power to the main load and immediately after the disconnection of the supplying of power thereto.

Normally, the load varies according to each output system in the power supply in which a plurality of output systems exists. In such case, it is necessary to optimize the artificial loads in accordance with size of the load. Therefore, the present invention provides a plurality of artificial loads having various kinds of amount of load, and selects the most suitable artificial load in accordance with size of the main load.

According to the present invention, since any of the plurality of artificial loads is selected in accordance with the size of the main load, it is possible to connect the most suitable artificial load corresponding to the size of the main load.

The present invention provides a plurality of artificial loads having different amount of load to each other, and fluctuates the amount of load by a combination of the artificial loads. It is disadvantageous in terms of cost and space if the artificial loads become large in variety. Therefore, the present invention connects the artificial load to the main load by fluctuating the amount of load, by combining a least variety of artificial loads.

According to the present invention, since the least artificial loads are provided, and the amount of load is fluctuated by their combination, it is possible to establish the structure which occupies small space and the cost is inexpensive.

In a case where there is a plurality of artificial loads in which the amount of load increases step by step, the present invention connects the artificial load to the main load, by increasing the amount of load of the artificial load step by step at the time immediately before the main load operates and decreasing the amount of load of the artificial load step by step at the time immediately after the operation of the main load is completed, in accordance with the size of load of the main load. Accordingly, the load varies before initiation of the operation of the main load and after the completion thereof, step by step.

According to the present invention, since the artificial load is connected by increasing the amount of load of the artificial load step by step at the time immediately before the main load operates and is connected by decreasing the amount of load of the artificial load step by step at the time immediately after the operation of the main load is completed, the load fluctuation of the main load fluctuates apparently smoothly, and thereby it is possible to minimize the voltage variation caused by the load fluctuation.

The present invention provides a plurality of artificial loads in which the amount of load is same to each other, and increases the artificial load by subsequently connecting the artificial loads in parallel to the main load at the time immediately before the main load operates, and decreases the artificial load by subsequently disconnecting the artificial loads from the main load at the time immediately after operation of the main load is completed. Accordingly, the load fluctuation of the main load fluctuates apparently smoothly, and thereby it is possible to minimize the voltage variation caused by the load fluctuation.

According to the present invention, since the artificial load is increased by subsequently connecting the artificial loads in parallel at the time immediately before the main load operates, and the artificial load is decreased by subsequently disconnecting the artificial loads at the time immediately after operation of the main load is completed, it suffices even when the number of artificial load is small, and can establish the structure in which the cost is inexpensive.

The power supply apparatuses described above are based on a method to fluctuate the artificial load in a so-called digital manner, but the present invention carries out the fluctuation continuously. For example, it may be considered to adopt a variable resistor or a method to convert a variation in an amount of light into a resistance change with a Cds, or the like as a way to fluctuate the amount of load continuously. In addition, the present invention increases the artificial load continuously (decreases resistance of the variable resistor) at the time immediately before the main load operates, and decreases the artificial load continuously (increases the resistance of the variable resistor) at the time immediately after operation of the main load is completed.

According to the present invention, since the artificial load is increased continuously at the time immediately before the main load operates and is decreased continuously at the time immediately after the operation of the main load is completed, it is possible to carry out the fluctuation of the main load even more smoothly.

A digital signal is easier to handle when controlling the load with a PC. Therefore, the present invention constructs a way to fluctuate the load by changing a width of pulse. The present invention gradually widens the width of pulse at the time immediately before the main load operates to increase the artificial load continuously, and gradually narrows the width of pulse at the time immediately after operation of the main load is completed to decrease the artificial load continuously.

According to the present invention, since the artificial load is increased continuously by gradually widening the width of pulse at the time immediately before the main load operates and is decreased continuously by gradually narrowing the width of pulse at the time immediately after operation of the main load is completed, it is possible to carry out control with the PC easily.

The present invention is capable of judging whether a value of varied voltage is to the extent that gives an adverse effect on a circuit or not, by further including a voltage variation detector for detecting the voltage variation caused by the load fluctuation of the main load. Accordingly, when the value of the varied voltage is not to the extent that gives the adverse effect on the circuit, the present invention disconnects the connection to make the load of the power supply light, since there is no necessity of connecting the artificial load.

According to the present invention, since the artificial load is disconnected from the output system of the power conversion circuit which is connected with the main load in a case where the voltage variation detected by the voltage variation detector is less than a predetermined amount of variation, it is possible to minimize unnecessary power consumption.

On the contrary, in a case where the voltage variation exceeds the predetermined amount of variation, in other words, where the load exceeds a range in which the load fluctuation is to be suppressed, the operation of suppressing the load fluctuation by the artificial load is configured not to be carried out, since the load fluctuation cannot be suppressed even when the artificial load is connected in such case.

According to the present invention, since the artificial load will not be connected to the output system of the power conversion circuit which is connected with the main load in a case where the voltage variation detected by the voltage variation detector is more than the predetermined amount of variation, it is possible to minimize the power consumption due to the unnecessary operation.

For example, in a case where a plurality of systems of the loads exists and where one of the main loads is connected with one artificial load, the operation of suppressing the fluctuation of other main loads cannot be carried out when a request for the operation of suppressing the fluctuation of other main loads is made, due to the fact that the necessary artificial load is in use. In other words, there is a possibility that addition of further load with respect to the artificial load while the artificial load is in operation makes control on the artificial load complicated and impairs accuracy. Furthermore, there is a possibility that entire load becomes too large and thus the power supply cannot supply the power, prior to the suppression of the voltage variation. The present invention is capable of avoiding such circumstance.

According to the present invention, since the artificial load controlling portion does not carry out new connecting operation with respect to the connected artificial load in a case where the artificial load has been connected to the output system of the power conversion circuit, it is possible to simplify the control of the artificial load, and to avoid the possibility that the entire load becomes too large and thus the power supply cannot supply the power, prior to the suppression of the voltage variation.

In a case where a plurality of main loads and a plurality of artificial loads exist, and the request for the operation of suppressing the fluctuation of other main loads is made when one of the artificial loads is connected to the main load, it is configured to select the artificial load other than the connected one and connect the selected artificial load with the main load.

According to the present invention, since the artificial load controlling portion carries out connecting operation with respect to an artificial load other than the connected artificial load in a case where one of the artificial loads has been connected to the output system of the power conversion circuit, it is possible to simplify the control of the artificial load.

When a capacity of supplying the power is deteriorated, for example when the power supply is the battery and it is consumed, it is configured not to carry out the operation of the artificial load for suppressing the voltage variation even if the voltage variation caused by the load fluctuation of the main load is generated, by judging that the power supply has no capacity of supplying the power.

According to the present invention, since the artificial load controlling portion does not carry out connecting operation of the artificial load in a case where a monitor has judged that the capacity of supplying power of the power supply apparatus is low, it is possible to avoid excessive application of load on the power supply.

DESCRIPTION OF THE PREFERRED EMBODIMENTS

Embodiment 1

Figure 1:
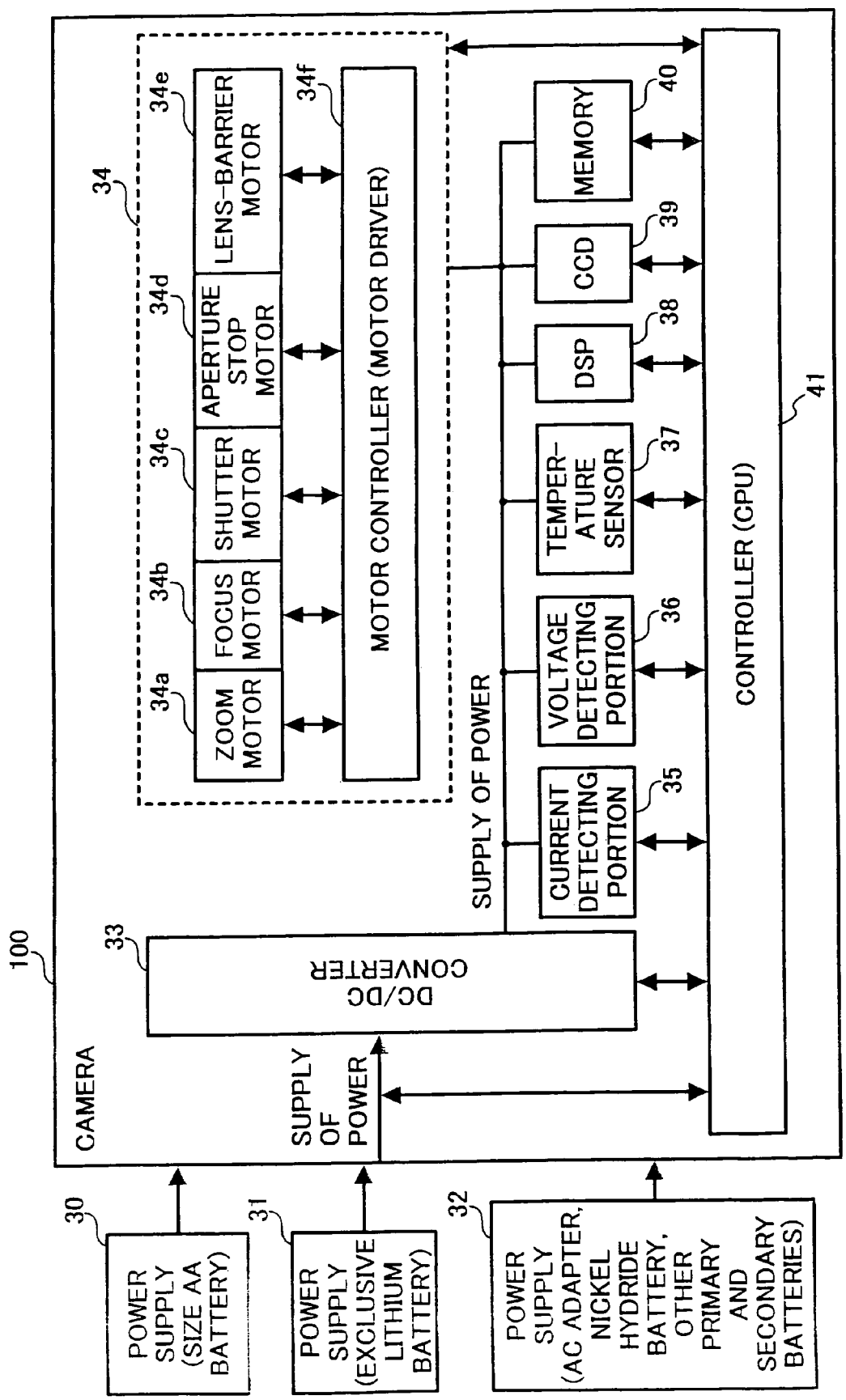
FIG. 1 is a block diagram of a digital camera according to an embodiment of the present invention.

Hereinafter, a digital camera according to the present invention will be described in detail in accordance with embodiment 1 shown in the drawings. However, it should be noted that structural elements, kinds, combinations, configurations or their relative arrangements described in this embodiment are merely illustrative by way of example, thus it is not intended to limit the scope of the present invention by them unless otherwise specifically stated.

FIG. 1 is a block diagram of a digital camera according to embodiment 1 of the present invention. The digital camera 100 comprises a size AA battery 30, an exclusive lithium battery 31 being used exclusively for the digital camera 100, an AC adapter 32 which are power supplies, a DC/DC converter 33 which converts power voltage to generate various voltage necessary for the camera, a motor portion 34 which includes various motors and controls them, a current detecting portion 35 for detecting current flowing from the DC/DC converter 33 through inside of the camera, and a voltage detecting portion 36 for detecting each voltage generated from the DC/DC converter 33. The digital camera 100 further comprises a temperature sensor 37 for detecting ambient temperature of the camera, a display (DSP) 38 structured by a LCD (Liquid Crystal Display) monitor or the like, a CCD (Charge Coupled Device) 39 for converting an light signal from a lens into an electrical signal, a memory 40 for storing images, and a controller (CPU, moderation mechanism) 41 which governs entire control of the camera. In addition, the motor portion 34 is structured by a zoom motor 34*a*, a focus motor 34*b*, a shutter motor 34*c*, an aperture stop motor 34*d*, a lens-barrier motor 34*e* and a motor driver 34*f* for controlling respective motors.

Five types of motors are used in the digital camera 100. When the motors are driven, drive current corresponding to a load flows to each of the motors. The current flowing to the motor is detected by the current detecting portion 35. In a case where a power supply is shared by the motors, a total amount of drive current flows out from the power supply if the motors are driven simultaneously. This is equivalent to a case that the load is increased from the viewpoint of the power supply, and thus a burden of the power source becomes increased. In order to prevent such case, the present invention carries out operation to avoid the plurality of motors to operate simultaneously and shift operating time thereof by the controller (CPU) 41.

In addition, a voltage-drop occurs by internal impedance of the power supply when the current flows to the motor. More specifically, the voltage-drop is large when the current is large and the voltage-drop is small when the current is small. This phenomenon can be detected by detecting the voltage of the power supply. Therefore, the present invention includes the voltage detecting portion 36 Which detects the voltage-drop of the power supply and decides the timing of driving of the focus motor 34*b* by the controller (CPU) 41 based on a result of the detection.

Also, power consumption of the power supply is decided by the product of current that flows to a circuit and time that the current flows to the circuit. Accordingly, it is necessary to allow a current value to be as small as possible to shorten the operating time of the motor, in order to use the size AA battery 30 and the exclusive lithium battery 31 longer. In addition, there is a case in which the motors used in the camera are operated simultaneously. In such case, it is possible to shorten the total operating time of the motors if operation of the motor which is shorter is completed within the operating time of the motor which is longer. Thereby, it is possible to realize the camera in which time required for manipulation is short and user-friendliness is high.

As the power supply of the camera, there are the size AA battery 30, the exclusive lithium battery 31 and the AC adapter 32. In addition, there are primary and secondary batteries for the battery, in which case the size AA battery 30 is the primary battery and the exclusive lithium battery 31 is the secondary battery. Those kinds of batteries have their own features. For example, it is needless to worry about the life of power supply with regard to the AC adapter 32, but it cannot be taken along. The primary battery is inexpensive, but it is impossible to reuse it since charging cannot be carried out. The secondary battery can be reused since the charging thereof can be carried out, although it is relatively expensive. In other words, if the kind of power supply loaded in the camera can be discriminated, it is possible to select the operation which corresponds to the discriminated kind. Therefore, the present invention discriminates the kind of power supply by the controller (CPU) 41. As a method for accomplishing this, for example, such a configuration can be utilized in which the kind of power supply is detected by a mechanical system which is not shown, or detects a difference of voltage of the power supply at the time of being set in the camera to detect the kind.

In addition, there are loads for the camera other than the motors, which are the display (DSP) 38, the CCD (Charge Coupled Device) 39 and the memory 40. A total of those loads become a full-load of the camera from the viewpoint of the power supply. However, it is not necessarily the case that the full-load is always consumed, depending on modes of the camera. More specifically, the load is light at the time of activation of the camera, since the display (DSP) 38 and the CCD (Charge Coupled Device) 39 are not in operation at that time. In other words, if such a configuration is employed in which condition of load of the camera is detected by the controller (CPU) 41 and the timing of operation of the digital camera is controlled in accordance with the load condition, the load fluctuation of the power supply becomes virtually constant, thereby it is possible to allow the voltage variation of the power supply to be small and allow a circuit in the camera to operate in a stable manner.

Furthermore, in the battery of the power supply, the volume within the battery changes according to the ambient temperature and hence a characteristic of the drive current changes. More specifically, the inner volume of the battery reduces when the ambient temperature becomes low, and thereby it becomes impossible to retrieve high current instantaneously out of the battery. Therefore, in such case, it is necessary to create the timing of operation in which the high current does not flow instantaneously. Accordingly, the present invention includes the temperature sensor 37 for detecting the ambient temperature of the camera, to control the timing of driving of the respective motors in accordance with a result of the detection.

In addition, there are various kinds of modes in the camera such as a normal mode, a power-saving mode and a high-speed mode. In addition, operation carried out in the camera varies depending on the modes. For example, in the high-speed mode, since it is required to operate the plurality of motors simultaneously, a large burden is applied on the power supply and hence it is necessary to avoid maximum current to be overlapped. Therefore, the present invention controls the timing of driving of the motors according to the respective modes by setting those modes with the DSP 38.

Figure 2A:
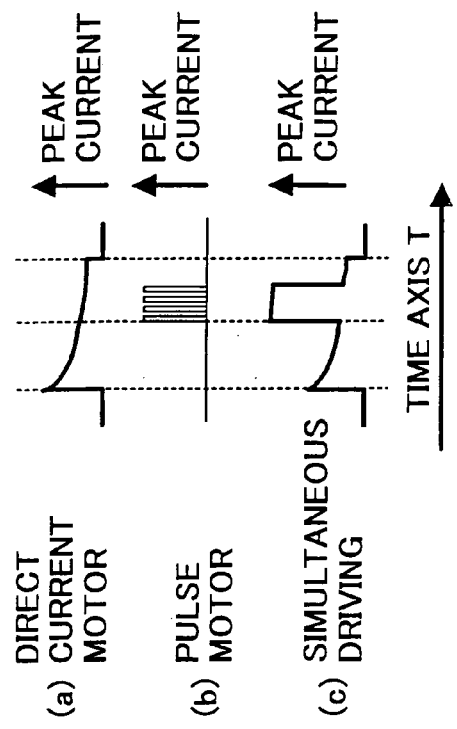
FIGS. 2A to 2G are diagrams showing current waveforms in respective motors and current waveform in a power supply of the digital camera according to the present invention.
Figure 2B:
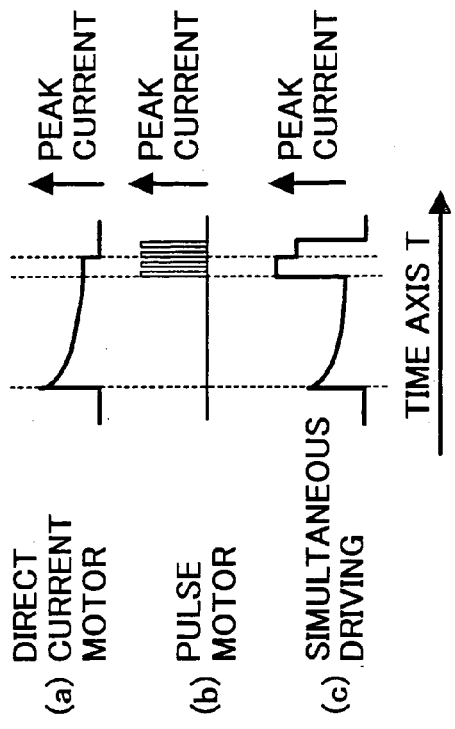
Figure 2C:
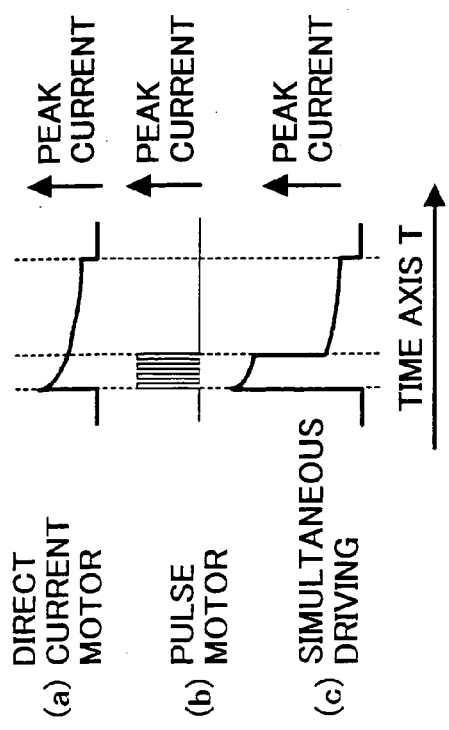
Figure 2D:
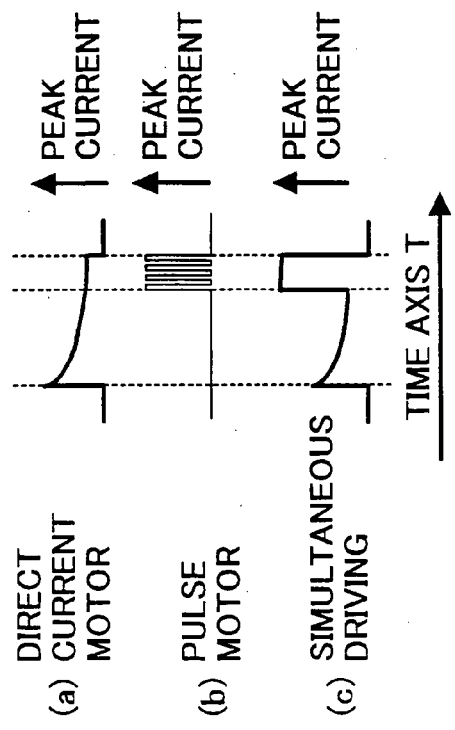
Figure 2F:
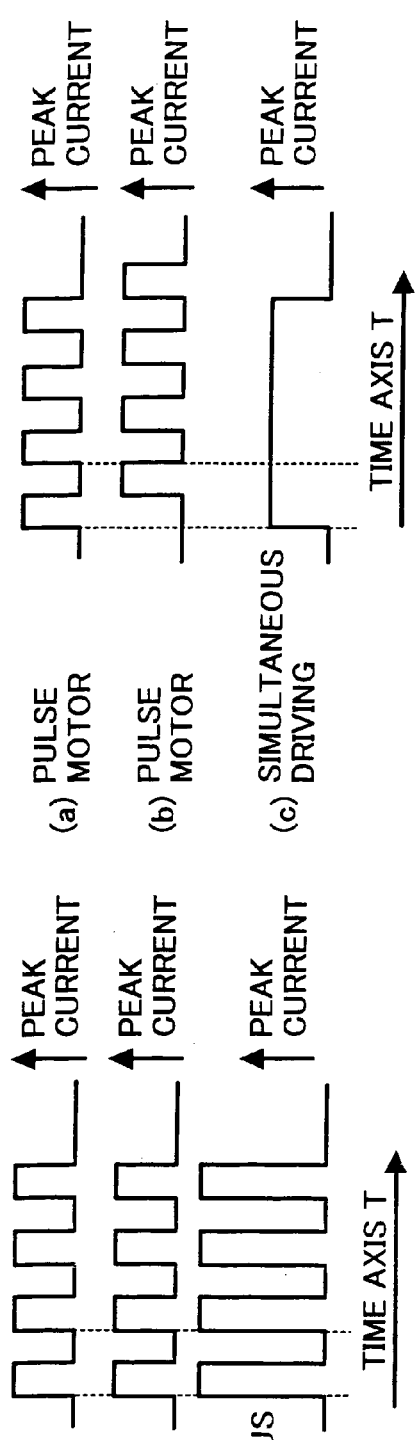
Figure 2E:
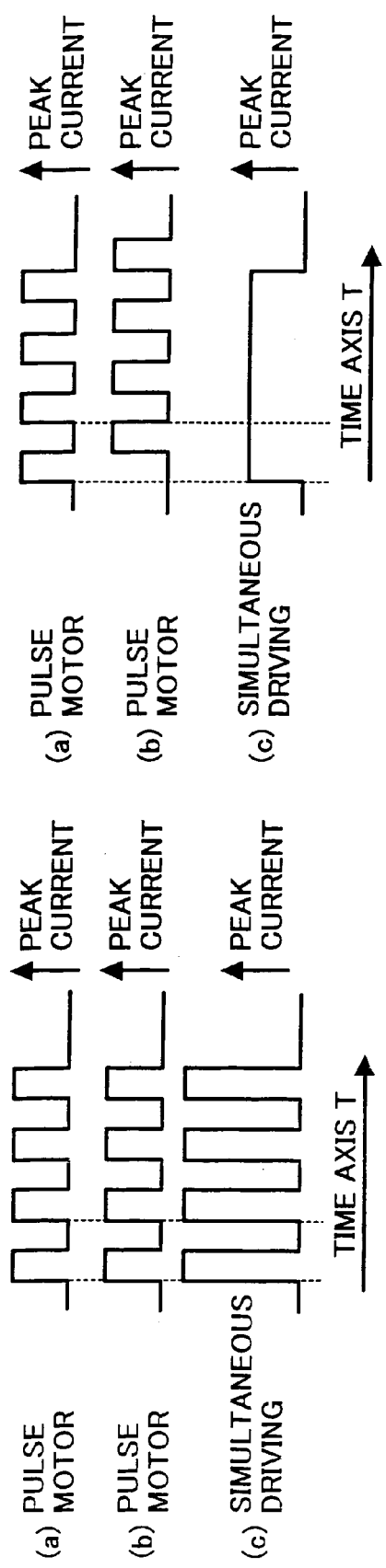
Figure 2G:
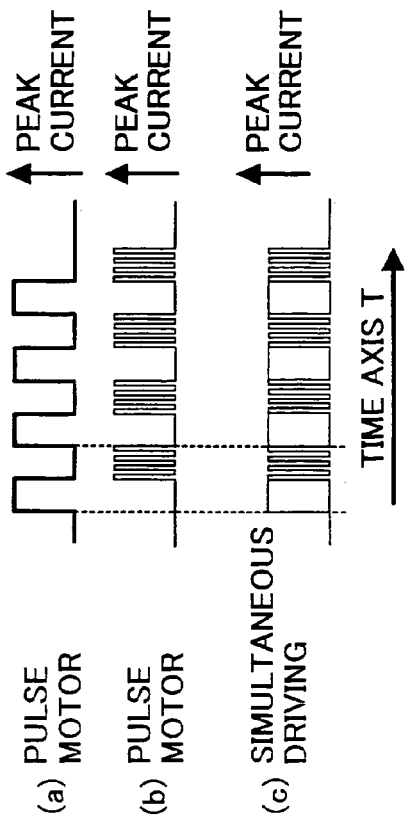

FIGS. 2A to 2G are diagrams showing current waveforms in the respective motors and current waveform in the power supply of the digital camera according to the present invention. Vertical axes in the respective diagrams represent a current value, and horizontal axes represent the time. FIGS. 2A and 2E are the diagrams of the conventional current waveforms which are illustrated for comparison, FIGS. 2B through 2D are the diagrams showing cases of the current waveforms generated by a direct current motor and a pulse motor, and FIGS. 2F and 2G are the diagrams showing cases of the current waveforms generated by two pulse motors.

In FIG. 2A, the direct current motor (a) has a characteristic in which a large current flows thereto in the initial stage of the driving and then the current gradually decreases. Also, in the pulse motor (b), pulse current in which the current values are substantially constant flow thereto. The current, in which the current values of the direct current motor and the pulse motor are totalized, flows out from the power supply as shown by (c) when those are driven simultaneously, and thus it is obvious that the large load is applied to the power supply.

In order to improve this circumstance, the timing of driving of the pulse motor (b) is shifted at virtually center as shown in FIG. 2B, so as to drive the pulse motor after the current of the direct current motor (a) is decreased. Accordingly, although the current in which the current values of the direct current motor and the pulse motor are totalized flows out from the power supply as shown by (c), it is obvious that its peak value is decreased as compared with FIG. 2A.

In order to further improve the above mentioned circumstance, the timing of driving of the pulse motor (b) is shifted to the point just before the operation of the direct current motor (a) is completed as shown in FIG. 2C, so as to drive the pulse motor after the current of the direct current motor (a) is decreased utmost. Accordingly, although the current in which the current values of the direct current motor and the pulse motor are totalized flows out from the power supply as shown by (c), it is obvious that the peak value is decreased even more as compared with FIG. 2B.

In order to improve the above mentioned circumstance more at the sacrifice of the time at some extent, the timing of driving of the pulse motor (b) is further shifted from the point of the completion of the operation of the direct current motor (a) as shown in FIG. 2D, so as to drive the pulse motor immediately before the current of the direct current motor (a) decreases utmost and the direct current motor goes off. Accordingly, although the current in which the current values of the direct current motor and the pulse motor are totalized flows out from the power supply as shown by (c), it is obvious that the peak value is decreased furthermore as compared with FIG. 2C.

FIG. 2E shows the case that phases of the timing of operation of the two pulse motors (a) and (b) at the time of movement are the same. It is obvious from this case that double the amount of current in which the current values of two pulse motors are totalized flows out from the power supply as shown by (c) if those are driven simultaneously, and thereby the large load is applied to the power supply.

In order to improve this circumstance, FIG. 2F shows a case in which the phases of the timing of operation of the two pulse motors (a) and (b) at the time of movement are shifted at 180°. When those are driven simultaneously, the current values of two pulse motors are totalized as shown by (c). However, since the phases are shifted from each other, the same current flow out from the power supply and thus it is obvious that the peak value is reduced as compared with FIG. 2E.

FIG. 2G shows a case that the pulse motor (b) is allowed to carry out predetermined operation at the timing of OFF of the pulse motor (a) when the pulse motor is moved. Although the current values of two pulse motors are totalized as shown by (c) when they are driven simultaneously, the drive current and operating current flow out from the power supply alternately as shown in the drawing, since the phases are shifted from each other. Therefore, it is obvious that the peak value is reduced as compared with FIG. 2E.

Figure 3A:
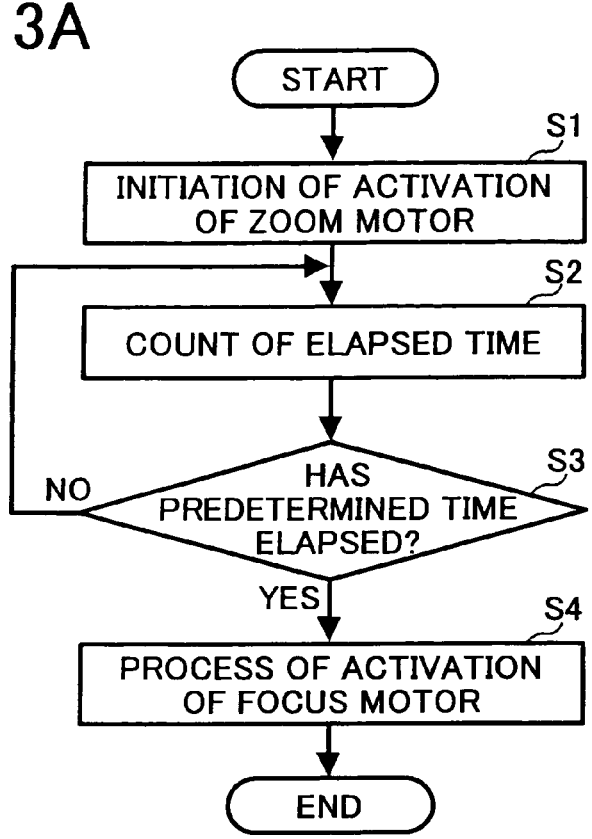
FIGS. 3A and 3B are flowcharts of operation for generating each timing with respect to FIGS. 2A to 2G according to the present invention.
Figure 3B:
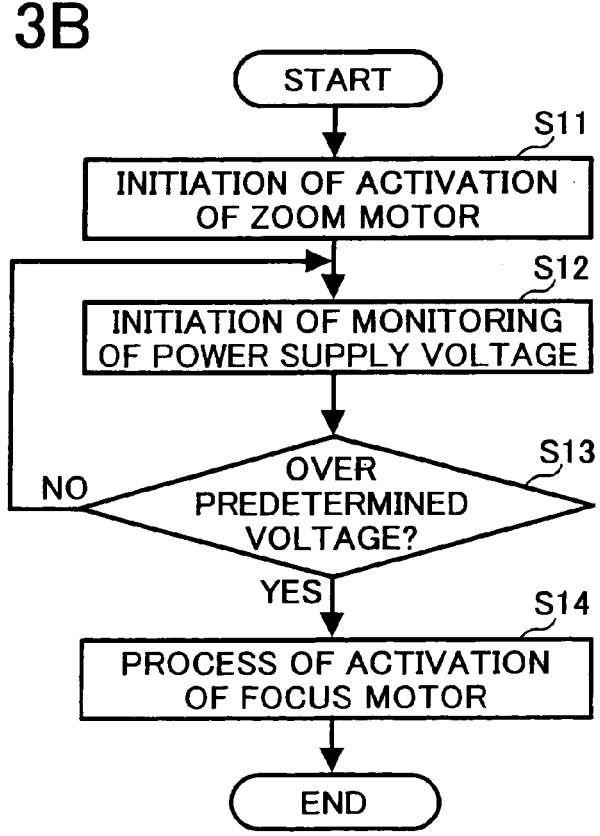

FIGS. 3A and 3B are flowcharts of operation for generating each timing with respect to FIGS. 2A to 2G. FIG. 3A is a flowchart in which the timing of driving is generated based on a lapse of time, while FIG. 3B is a flowchart in which the timing of driving is generated by monitoring the voltage of the power supply.

First, to explain FIG. 3A, when a zoom motor (for example, direct current motor) starts its activation (S1), a timer is started to count the time (S2). Then, it is monitored whether the timer has counted a predetermined time or not (S3), and if the predetermined time has elapsed, next, the focus motor (for example, pulse motor) is activated (S4). In this flowchart, it is necessary to previously find out how long is the predetermined time required and set that time.

Next, to explain FIG. 3B, when a zoom motor (for example, direct current motor) starts its activation (S11), monitoring of voltage of the power supply is initiated (S12). Then, it is monitored whether or not the monitored voltage is over a predetermined voltage (S13), and when detecting that it is over the predetermined voltage, next, the focus motor (for example, pulse motor) is activated (S14). In this flowchart, it is necessary to previously find out how much does the voltage of the power supply drop when the voltage is dropped by the load current and set that voltage.

Hereinafter, a power supply apparatus according to the present invention will be described in detail in accordance with embodiments 2 to 6 shown in the drawings. However, it should be noted that structural elements, kinds, combinations, configurations or their relative arrangements described in these embodiments are merely illustrative by way of example, thus it is not intended to limit the scope of the present invention by them unless otherwise specifically stated.

FIGS. 4A to 4E schematically show the power supply apparatuses which are suitable for the above described digital camera according to embodiments of the present invention. Meanwhile, in the drawings, a power supply, a power conversion circuit, a main load, an artificial load, and an artificial load controlling portion are represented as PS, PCNV, ML, VL and VLCNT, respectively. As a matter of simplification of explanation, the descriptions of cases will be given below in which one main load ML is provided. In addition, although the power supply apparatus is suitable for the digital camera in the above described embodiment, it should be noted that it is possible to apply the power supply apparatus to other digital cameras, or to any devices.

Embodiment 2

Figure 4A:
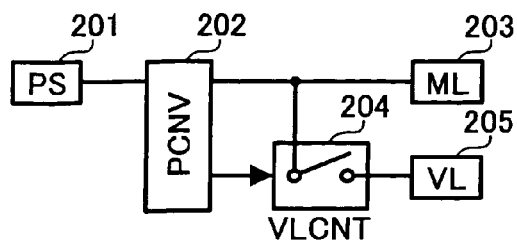
FIGS. 4A to 4E schematically show power supply apparatuses according to embodiments of the present invention.

FIG. 4A is a diagram showing the power supply apparatus according to the embodiment 2, which comprises a power supply 201 constructed by a battery or an AC adapter or the like, a power conversion circuit 202 (moderation mechanism) for converting the power from the power supply 201 into predetermined voltage and controlling the supplying of power according to increase and decrease of a load by monitoring the output voltage, a main load 203 which structures a principal load such as a motor and an electronic circuit and so on, an artificial load 205 structured by a load which is lighter in load than the main load 203, and an artificial load controlling portion 204 for connecting the artificial load 205 with the main load 203 and disconnecting the artificial load from the main load 203. Meanwhile, although it is described here as if the artificial load controlling portion 204 is controlled by the power conversion circuit 202, the artificial load controlling portion may be controlled by a control circuit which is not shown. The characteristic of the present embodiment is that it includes the artificial load 205 for suppressing the load fluctuation caused by the main load 203 and the artificial load controlling portion 204 for connecting the artificial load with the main load 203 or disconnecting it from the main load 203, other than the main load 203. Generally, a power supply apparatus is provided with the power conversion circuit 202 which operates to increase and decrease the supplying of power when the load is fluctuated, in order to maintain the voltage constant. However, it cannot help accepting the load fluctuation at some extent since it is impossible to follow the speed of the load fluctuation. The drastic generation of the load fluctuation has been a major cause thereof (see FIG. 5). Therefore, the present embodiment suppresses the load fluctuation caused by the main load 203, by connecting the artificial load 205 with the main load immediately before the power is supplied to the main load 203 and immediately after the supplying of power is disconnected.

Embodiment 3

Figure 4B:
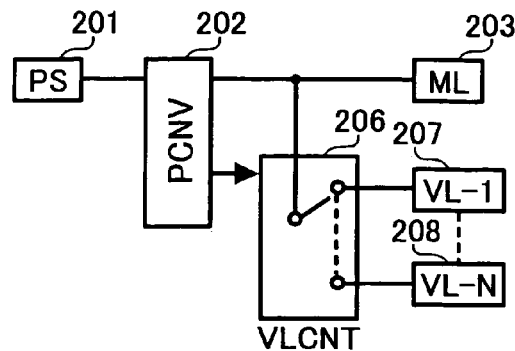

FIG. 4B is a diagram showing the power supply apparatus according to the embodiment 3. In this embodiment, since the same reference numeral is attached to the component part similar to the above embodiment, the overlapping explanation will be omitted here. The points that FIG. 4B differs from FIG. 4A are that the artificial load shown in FIG. 4A has turned into artificial loads 207–208 having different amount of loads, respectively, and an artificial load controlling portion 206 selects either one of those artificial loads. More specifically, normally, the load varies according to each output system in the power supply in which a plurality of output systems exists. In such case, it is necessary to optimize the artificial loads in accordance with size of the load. Therefore, the present embodiment includes a plurality of artificial loads 207–208 having the various kind of amount of load, and selects the most suitable artificial load with the artificial load controlling portion 206 in accordance with size of the main load 203. For example, it selects the artificial load in such a manner that the load fluctuation becomes small, such as selecting the artificial load having 50 mA when the main load is a motor (100 mA), or the artificial load having 25 mA when the load is a CCD (50 mA).

Also, the present embodiment structures the artificial load in such a manner as to increase the amount of load step by step, and in accordance with the size of the load in the main load 203, connects the artificial load to the main load by increasing the amount of load of the artificial load step by step at the time immediately before the main load 203 operates and disconnects the artificial load from the main load by decreasing the amount of load of the artificial load step by step at the time immediately after operation of the main load is completed. Accordingly, the load changes step by step at the point before the operation of the main load is initiated and after the operation is completed. For example, when it is assumed that the load of the artificial load 201=25 (mA), the load of the artificial load 202=50 (mA) . . . load of artificial load N=N (mA)>50 (mA) from the artificial load 201 to the artificial load N, respectively, the load fluctuation by the artificial load for suppressing the voltage variation is increased step by step, by operating the artificial load 201 firstly, then switching over the operation to the artificial load 202, and switching over the operation to the artificial load N lastly, to increase the artificial load step by step. Alternately, it is possible to decrease the artificial load step by step, in an opposite manner thereof.

Embodiment 4

Figure 4C:
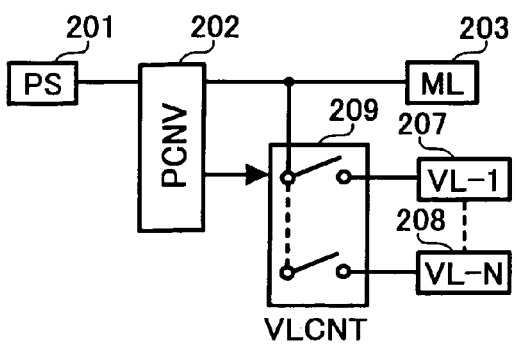

FIG. 4C is a diagram showing the power supply apparatus according to the embodiment 4. In this embodiment, since the same reference numeral is attached to the component part similar to the above embodiments, the overlapping explanation will be omitted here. The point that FIG. 4C differs from FIG. 4B is that an artificial load controlling portion 209 is configured to switch over the plurality of loads, selectively. More specifically, it selects the number of artificial loads to be connected in parallel and a location of the artificial loads such that the amount of load of the artificial load changes. For example, it selects the artificial loads such that the artificial loads become 50 mA when the main load is the motor (100 mA), and such that the artificial loads become 25 mA when the main load is a video amplifier (50 mA).

Also, it includes a plurality of artificial loads in which the amount of load is same to each other, subsequently connects the artificial loads in parallel to the main load at the time immediately before the main load operates to increase the artificial load, and subsequently disconnects the artificial loads from the main load at the time immediately after operation of the main load is completed to decrease the artificial load. Accordingly, the load fluctuation of the main load 203 fluctuates apparently smoothly, and thereby it is possible to minimize the voltage variation caused by the load fluctuation. For example, when it is assumed that the load in the artificial loads from the artificial load 201 to the artificial load N is load=25 (mA), respectively, the load fluctuation by the artificial loads for suppressing the voltage variation is increased step by step, by operating the artificial load 201 firstly, then operating the artificial load 202 in such a manner as to be overlapped with the artificial load 201, and operating the artificial load N lastly in the overlapping manner, to increase the artificial load step by step. Alternately, it is possible to decrease the artificial load step by step, in an opposite manner thereof.

Embodiment 5

Figure 4D:
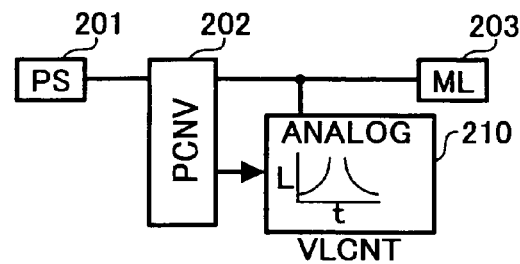

FIG. 4D is a diagram showing the power supply apparatus according to the embodiment 5. In this embodiment, since the same reference numeral is attached to the component part similar to the above embodiments, the overlapping explanation will be omitted here. The point that FIG. 4D differs from FIGS. 4A to AC is that an artificial load controlling portion 210 is configured to change the load in an analog manner. The power supply apparatuses according to the embodiments 2 to 4 are based on the method to fluctuate the artificial load in a so-called digital manner, but the present embodiment carries out the fluctuation continuously. For example, it may be considered to adopt a variable resistor or a method to convert a variation in an amount of light into a resistance change with a Cds, or the like as a way to fluctuate the amount of load continuously. In addition, the present embodiment increases the artificial load 210 continuously (decreases resistance in a case of the variable resistor) at the time immediately before the main load 203 operates, and decreases the artificial load 210 continuously (increases the resistance in the case of the variable resistor) at the time immediately after operation of the main load 203 is completed. Furthermore, by increasing or decreasing the load continuously such as in linear, quadratic curve or logarithm manner as a load characteristic, it is possible to suppress the voltage variation.

Embodiment 6

Figure 4E:
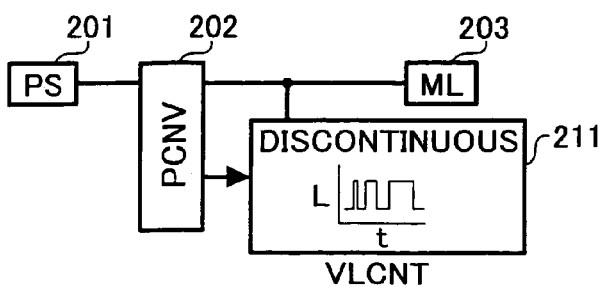

FIG. 4E is a diagram showing the power supply apparatus according to the embodiment 6. In this embodiment, since the same reference numeral is attached to the component part similar to the above embodiments, the overlapping explanation will be omitted here. The point that FIG. 4E differs from FIGS. 4A to AC is that an artificial load controlling portion 211 is configured to change the load discontinuously. Although the embodiment 5 is based on the method to fluctuate the artificial load continuously, the present embodiment carries out the fluctuation discontinuously. More specifically, a digital signal is easier to handle when controlling the load with a PC. Therefore, the present embodiment constructs the way to fluctuate the load by changing a width of pulse. The present embodiment gradually widens the width of pulse at the time immediately before the main load 203 operates to increase the artificial load 211 continuously, and gradually narrows the width of pulse at the time immediately after operation of the main load 203 is completed to decrease the artificial load continuously.

Figure 5:
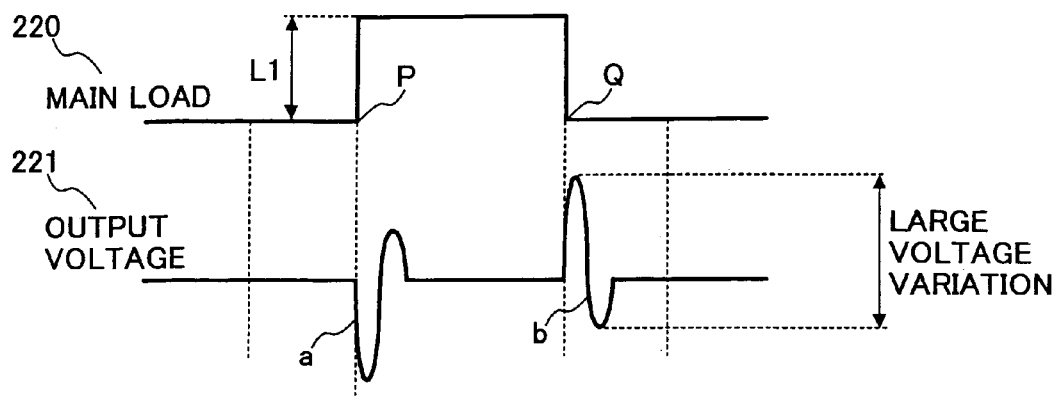
FIG. 5 is a diagram to show a main load and change in output voltage caused thereby in a case that operation for suppressing load fluctuation is not carried out, to explain the operation of the present invention.

FIG. 5 is a diagram to show a main load and change in output voltage caused thereby in a case that operation for suppressing load fluctuation is not carried out, to explain the operation of the present invention. When a load of a main load 220 fluctuates drastically at a point P up to a load L1, a so-called ringing phenomenon is generated in which voltage lowers largely and rises again in such a manner as shown by a waveform "a", since the output voltage 221 cannot follow the drastic fluctuation of the main load. The fluctuating time thereof varies according to whether the load is capacitive or inductive. The output voltage 221 does not vary when the load is stable, but a so-called ringing phenomenon is generated in which the voltage rises largely and lowers again in such a manner as shown by a waveform "b" when the load of the main load 220 fluctuates until zero at a point Q, since the output voltage 221 cannot follow that drastic fluctuation. This peak value becomes a width of voltage variation.

Figure 6:
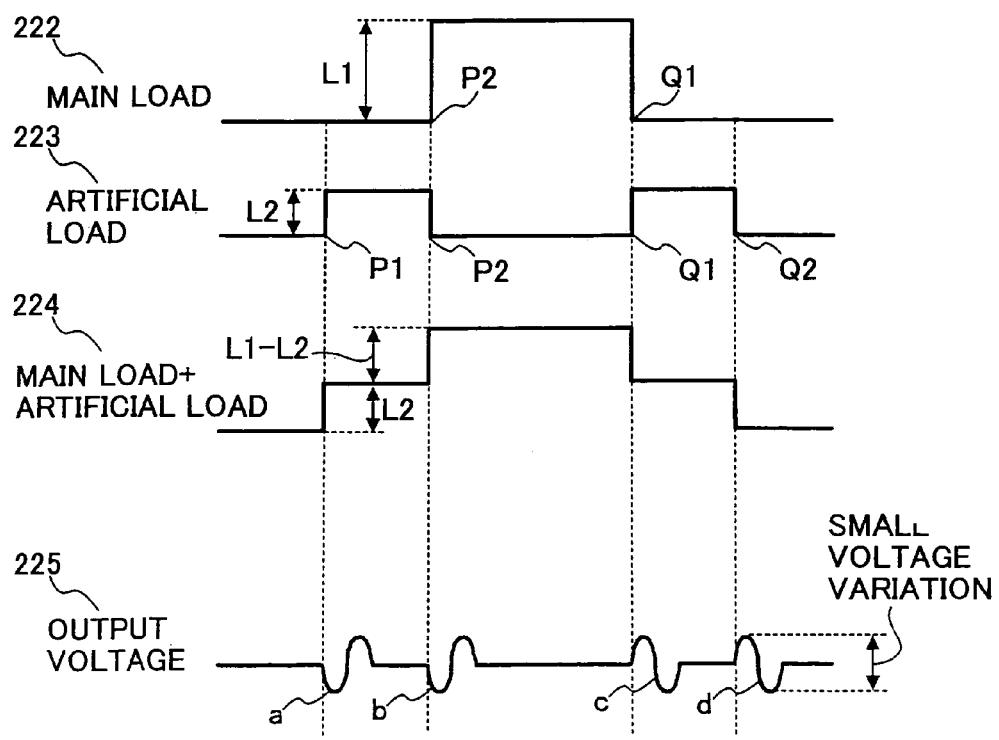
FIG. 6 is a diagram for explaining a method for suppressing load fluctuation according to the present invention.

FIG. 6 is a diagram for explaining a method for suppressing load fluctuation according to the present invention. The present invention suppresses the drastic load fluctuation at the time of driving a main load 222, by previously connecting an artificial load 223 before and after the driving of the main load 222. Here, it is assumed that a load L2 of the artificial load 223 has the amount of load which is approximately half of the load L1 of the main load 222. More specifically, the artificial load 223 is allowed to fluctuate up to the load L2 at a point P1 before the main load 222 operates. Since the load is half of that of the main load, a so-called ringing phenomenon is generated in which output voltage 225 lowers small and rises again in such a manner as shown by a waveform "a". The fluctuating time thereof varies according to whether the load is capacitive or inductive. The output voltage 225 does not vary when the load is stable, but when the artificial load 223 is at a point P2 and the load is L2 and the main load 222 fluctuates up to the load L1 from that point, the amount of variation becomes substantially as (L1−L2), thereby a so-called ringing phenomenon is generated in which the output voltage 225 lowers small at the point P2 and rises again in such a manner as shown by a waveform "b". This is because of the fact that a total load of the main load and the artificial load changes as shown by a reference numeral 224. In addition, the output voltage 225 does not vary when the load is stable, but when the artificial load 223 fluctuates up to the load L2 at a point Q1 and at the same time, when the main load 222 fluctuates to the load L1 from that point, the amount of variation becomes substantially as (L1−L2), thereby a so-called ringing phenomenon is generated in which the output voltage 225 rises small at the point Q1 and lowers again in such a manner as shown by a waveform "c". Finally, the load L2 of the artificial load 223 fluctuates until zero at a point Q2, and a so-called ringing phenomenon is generated in which the output voltage rises small and lowers again in such a manner as shown by a waveform "d". This peak value becomes a width of voltage variation. It is obvious that the width of voltage variation is made small as compared with the width of voltage variation shown in FIG. 5.

Meanwhile, the amount of load of the artificial load is set as approximately half of the main load as shown in the drawing, but other values may be employed without limiting the value by approximately half of the main load. In addition, it may also be recommendable to provide a plurality of artificial loads to increase and decrease the loads step by step.

Figure 7:
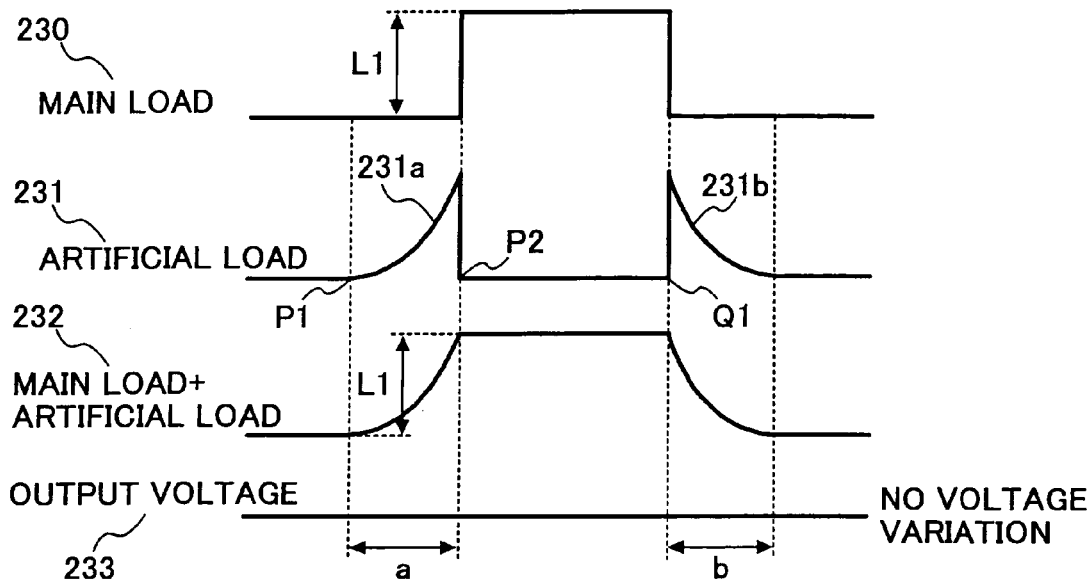
FIG. 7 is a diagram for explaining other method for suppressing load fluctuation according to the present invention.

FIG. 7 is a diagram for explaining other method for suppressing load fluctuation according to the present invention. The present invention suppresses the drastic load fluctuation at the time of driving a main load 230, by previously connecting an artificial load 231 which varies continuously (in the analog manner) before and after the driving of the main load 230. Here, it is assumed that a load 231a of the artificial load 231 has the characteristic of quadratic curve. More specifically, the artificial load 231 is allowed to fluctuate continuously from a point P1 to a point p2 before the main load 230 operates. Because the load of the artificial load has the quadratic curve characteristic, output voltage 233 seldom varies nor does the output voltage 233 vary at the time when the load is stable. In addition, if the artificial load 231 reaches a load L1 at a point P2 and at the same time, the main load 230 fluctuates up to the load L1 from that point, the amount of variation becomes substantially as (L1−L1=0), hence the output voltage 233 hardly varies at the point P2. By the operation in which the artificial load 231 changes in such a manner as shown by a load characteristic 231b from a point Q1 where the main load finishes its operation, the output voltage 233 seldom varies and can be stabled. This is because of the fact that a total load of the main load 230 and the artificial load 231 changes as shown by a reference numeral 232.

Figure 8:
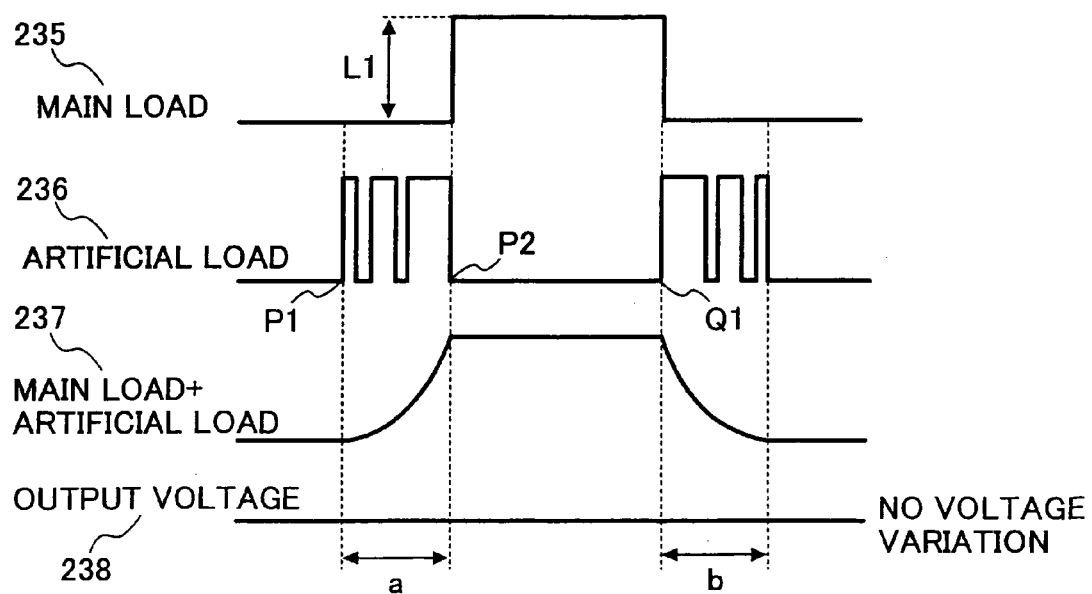
FIG. 8 is a diagram for explaining other method for suppressing load fluctuation according to the present invention.

FIG. 8 is a diagram for explaining other method for suppressing load fluctuation according to the present invention. The present invention suppresses the drastic load fluctuation at the time of driving a main load 235, by previously connecting an artificial load 236 which varies discontinuously (in a pulse manner) before and after the driving of the main load 235. Here, it is assumed that a width of pulse is modulated with respect to the artificial load 236. More specifically, the artificial load 236 is allowed to fluctuate discontinuously from a point P1 to a point p2 before the main load 235 operates. Because the load has a characteristic in which the width of the pulse is changed, output voltage 238 seldom varies nor does the output voltage 238 vary at the time when the load is stable. This is because of the fact that a total load of the main load 235 and the artificial load 236 changes as shown by a reference numeral 237. In addition, if the artificial load 236 reaches a load L1 at a point P2 and at the same time, the main load 235 fluctuates up to the load L1 from that point, the amount of variation becomes substantially as (L1−L1=0), hence the output voltage 238 hardly varies at the point P2. By the operation in which the artificial load 236 changes in such a manner as shown by a load characteristic 237 from a point Q1 where the main load finishes its operation, the output voltage 238 seldom varies and can be stabled.

Figure 9:
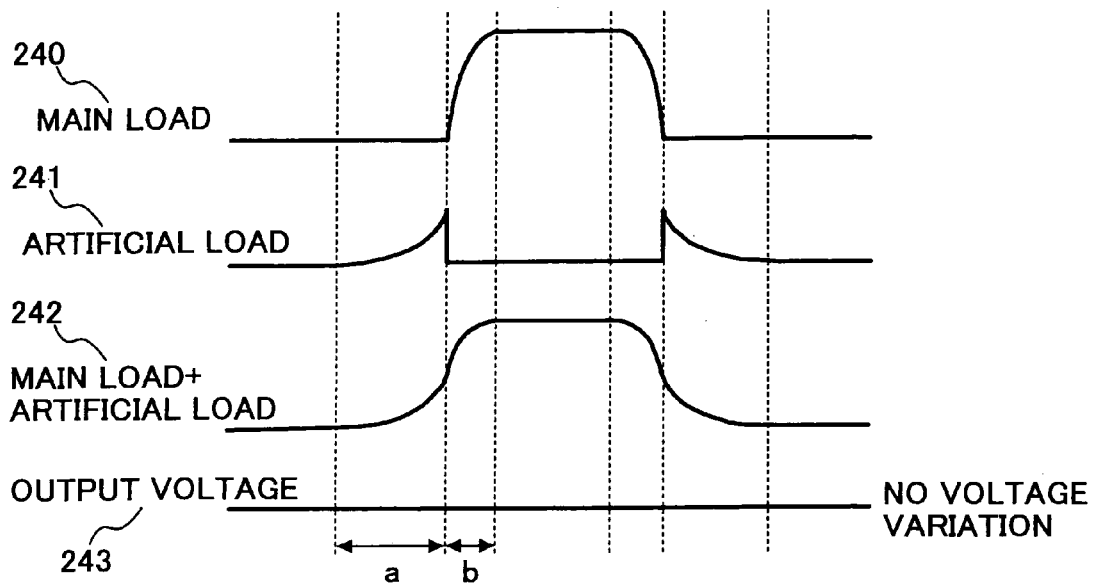
FIG. 9 is a diagram for explaining other method for suppressing load fluctuation according to the present invention.

FIG. 9 is a diagram for explaining other method for suppressing load fluctuation according to the present invention. The present invention suppresses the drastic load fluctuation at the time of driving a main load 240, by previously connecting an artificial load 241 which varies continuously (in the analog manner) before and after the driving of the main load 240. A point that FIG. 9 differs from FIG. 7 is that the connection of the artificial load 241 to the main load is ceased in mid-course of the operation, since the characteristic of the fluctuation of the main load 240 is not drastic and fluctuates smoothly at some extent. Other operations are same as that of FIG. 7 and explanations thereof are omitted here accordingly. More specifically, the present embodiment further includes a voltage variation detector for detecting the voltage variation caused by the load fluctuation of the main load 240, to judge whether a value of varied voltage is to the extent that gives an adverse effect on a circuit or not, and when the value of the varied voltage is not to the extent that gives the adverse effect on the circuit, disconnects the connection in the mid-course to make the load of the power supply light, since there is no necessity of connecting the artificial load 241. In this example shown in the drawing, the artificial load 241 is changed continuously in a region "a" and the artificial load 241 is disconnected in a region "b", since the load fluctuation of the main load 240 is moderate in that region.

Figure 10:
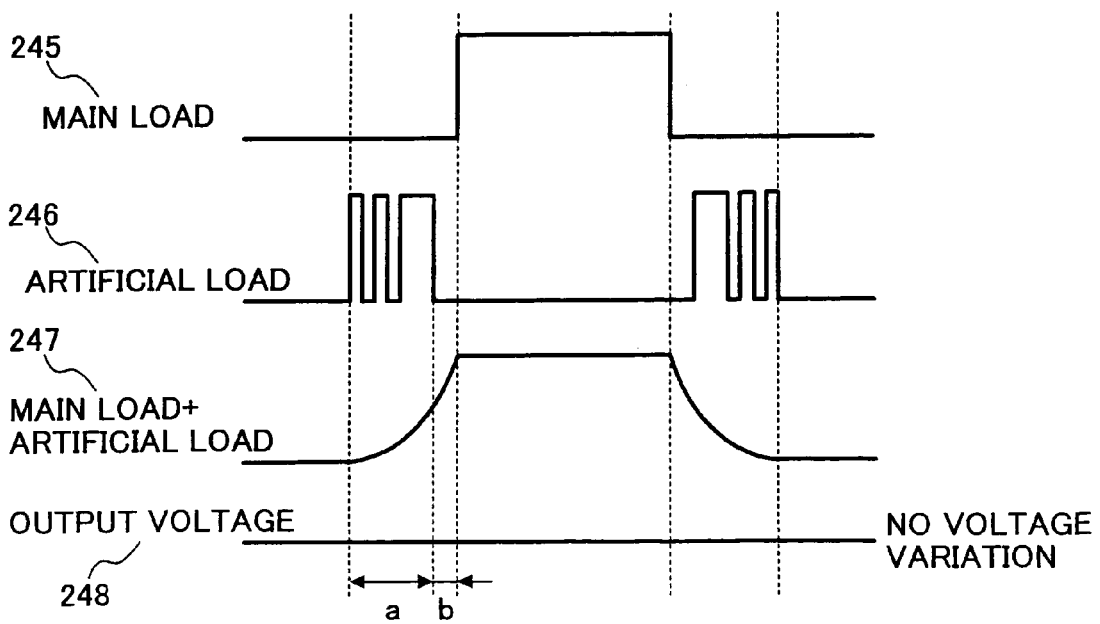
FIG. 10 is a diagram for explaining other method for suppressing load fluctuation according to the present invention.

FIG. 10 is a diagram for explaining other method for suppressing load fluctuation according to the present invention. The present invention suppresses the drastic load fluctuation at the time of driving a main load 245, by previously connecting an artificial load 246 which varies discontinuously (in the pulse manner) before and after the driving of the main load 245. A point that FIG. 10 differs from FIG. 8 is that the connection of the artificial load 246 to the main load is ceased in mid-course of the operation. Other operations are same as that of FIG. 8 and explanations thereof are omitted here accordingly. More specifically, the present embodiment further includes a voltage variation detector for detecting the voltage variation caused by the load fluctuation of the main load 245, to judge whether a value of varied voltage is to the extent that gives an adverse effect on a circuit or not, and when the value of the varied voltage is not to the extent that gives the adverse effect on the circuit, disconnects the connection in the mid-course to make the load of the power supply light, since there is no necessity of connecting the artificial load 246. In this example shown in the drawing, the artificial load 246 is changed discontinuously in a region "a" and the artificial load 246 is disconnected in a region "b", since the load fluctuation of the main load 245 is moderate in that region.

Also, opposite of the cases in FIGS. 9 and 10, in a case where the voltage variation exceeds a predetermined amount of variation, in other words, where the load exceeds a range in which the load fluctuation is to be suppressed, the operation of suppressing the load fluctuation carried out by the artificial load is configured not to be carried out, since the load fluctuation cannot be suppressed even when the artificial load is connected in such case.

In the foregoing explanations, for example, in a case where a plurality of systems of the loads exists and where one of the main loads is connected with one artificial load, the operation of suppressing the fluctuation of other main loads cannot be carried out when a request for the operation of suppressing the fluctuation of other main loads is made, due to the fact that the necessary artificial load is in use. In other words, there is a possibility that addition of further load with respect to the artificial load while the artificial load is in operation makes control on the artificial load complicated and impairs accuracy. Furthermore, there is a possibility that entire load becomes too large and thus the power supply cannot supply the power, prior to the suppression of the voltage variation.

However, in a case where a plurality of main loads and a plurality of artificial loads exist, and the request for the operation of suppressing the fluctuation of other main loads is made when one of the artificial loads is connected to the main load, it is effective to select the artificial load other than the connected one and connect it with the main load.

Also, when a capacity of supplying the power is deteriorated, for example when the power supply is the battery and it is consumed, it is also effective not to carry out the operation of the artificial load for suppressing the voltage variation even if the voltage variation caused by the load fluctuation of the main load is generated, by judging that the power supply has no capacity of supplying the power.

The entire disclosure of Japanese application Nos. 2003-307544 and 2003-329086 are hereby incorporated by reference.

What is claimed is:

1. A power supply apparatus, comprising
a power conversion circuit which monitors output voltage and controls supply of power according to increase and decrease of a load;
a main load as a cause for generation of a voltage variation;
at least one artificial load for suppressing the voltage variation caused by the main load; and
an artificial load controlling portion for connecting the artificial load to an output system of said power conversion circuit and disconnecting the artificial load from the output system, wherein
said artificial load controlling portion connects said at least one artificial load to the output system of the power conversion circuit which is connected with said main load, immediately before said main load operates and immediately after operation of said main load is completed.

2. The power supply apparatus according to claim 1, wherein said artificial load is lighter in load than said main load.

3. The power supply apparatus according to claim 1, wherein said artificial load is structured by a plurality of artificial loads having a different amount of load, and said artificial load controlling portion selects any of said plurality of artificial loads in accordance with a size of load of said main load and connects a selected artificial load to the output system of the power conversion circuit which is connected with said main load.

4. The power supply apparatus according to claim 2, wherein said artificial load is structured by a plurality of artificial loads having a different amount of load, and said artificial load controlling portion selects any of said plurality of artificial loads in accordance with a size of load of said main load and connects a selected artificial load to the output system of the power conversion circuit which is connected with said main load.

5. The power supply apparatus according to claim 1, wherein said artificial load is structured by a plurality of artificial loads having a different amount of load, and said artificial load controlling portion connects the artificial load to the output system of the power conversion circuit which is connected with said main load by fluctuating the amount of load of the artificial load, by means of selectively switching over said plurality of artificial loads in accordance with a size of load of said main load.

6. The power supply apparatus according to claim 2, wherein said artificial load is structured by a plurality of artificial loads having a different amount of load, and said artificial load controlling portion connects the artificial load to the output system of the power conversion circuit which is connected with said main load by fluctuating the amount of load of the artificial load, by means of selectively switching over said plurality of artificial loads in accordance with a size of load of said main load.

7. The power supply apparatus according to claim 1, wherein said artificial load is structured by a plurality of artificial loads in which an amount of load increases step by step, and said artificial load controlling portion connects the artificial load to the output system of the power conversion circuit which is connected with said main load, by increasing the amount of load of said artificial load step by step at the time immediately before said main load operates and decreasing the amount of load of said artificial load step by step at the time immediately after the operation of said main load is completed, in accordance with a size of load of said main load.

8. The power supply apparatus according to claim 2, wherein said artificial load is structured by a plurality of artificial loads in which an amount of load increases step by step, and said artificial load controlling portion connects the artificial load to the output system of the power conversion circuit which is connected with said main load, by increasing the amount of load of said artificial load step by step at the time immediately before said main load operates and decreasing the amount of load of said artificial load step by step at the time immediately after the operation of said main load is completed, in accordance with a size of load of said main load.

9. The power supply apparatus according to claim 1, wherein said artificial load is structured by a plurality of artificial loads having a same amount of load, and said artificial load controlling portion connects the artificial load to the output system of the power conversion circuit which is connected with said main load, by increasing said artificial load at the time immediately before said main load operates by means of overlapping said artificial load subsequently, and decreasing said artificial load at the time immediately after the operation of said main load is completed by means of disconnecting said artificial load subsequently, in accordance with a size of load of said main load.

10. The power supply apparatus according to claim 2, wherein said artificial load is structured by a plurality of artificial loads having a same amount of load, and said artificial load controlling portion connects the artificial load to the output system of the power conversion circuit which is connected with said main load, by increasing said artificial load at the time immediately before said main load operates by means of overlapping said artificial load subsequently, and decreasing said artificial load at the time immediately after the operation of said main load is completed by means of disconnecting said artificial load subsequently, in accordance with a size of load of said main load.

11. The power supply apparatus according to claim 1, wherein said artificial load is structured by an artificial load in which an amount of load increases continuously, and said artificial load controlling portion connects the artificial load to the output system of the power conversion circuit which is connected with said main load, by increasing said artificial load continuously at the time immediately before said main load operates and decreasing said artificial load continuously at the time immediately after the operation of said main load is completed, in accordance with a size of load of said main load.

12. The power supply apparatus according to claim 2, wherein said artificial load is structured by an artificial load in which an amount of load increases continuously, and said artificial load controlling portion connects the artificial load to the output system of the power conversion circuit which is connected with said main load, by increasing said artificial load continuously at the time immediately before said main load operates and decreasing said artificial load continuously at the time immediately after the operation of said main load is completed, in accordance with a size of load of said main load.

13. The power supply apparatus according to claim 1, wherein said artificial load is structured by an artificial load in which an amount of load increases discontinuously, and said artificial load controlling portion connects the artificial load to the output system of the power conversion circuit which is connected with said main load, by increasing said artificial load discontinuously at the time immediately before said main load operates and decreasing said artificial load discontinuously at the time immediately after the operation of said main load is completed, in accordance with a size of load of said main load.

14. The power supply apparatus according to claim 2, wherein said artificial load is structured by an artificial load in which an amount of load increases discontinuously, and said artificial load controlling portion connects the artificial load to the output system of the power conversion circuit which is connected with said main load, by increasing said artificial load discontinuously at the time immediately before said main load operates and decreasing said artificial load discontinuously at the time immediately after the operation of said main load is completed, in accordance with a size of load of said main load.

15. The power supply apparatus according to claim 1, further comprising a voltage variation detector for detecting the voltage variation caused by said main load, wherein said artificial load controlling portion disconnects said artificial load from the output system of the power conversion circuit which is connected with said main load when the voltage variation detected by said voltage variation detector is less than a predetermined amount of variation.

16. The power supply apparatus according to claim 1, further comprising a voltage variation detector for detecting the voltage variation caused by said main load, wherein said artificial load controlling portion does not connect said artificial load to the output system of the power conversion circuit which is connected with said main load when the voltage variation detected by said voltage variation detector is more than a predetermined amount of variation.

17. The power supply apparatus according to claim 1, wherein, when said artificial load has been connected to the output system of said power conversion circuit, said artificial load controlling portion does not carry out new connecting operation with respect to the connected artificial load.

18. The power supply apparatus according to claim 1, wherein, when one of said artificial loads has been connected to the output system of said power conversion circuit, said artificial load controlling portion carries out connecting operation with respect to an artificial load other than the connected artificial load.

19. The power supply apparatus according to claim 1, further comprising a monitor for monitoring a capacity of supplying power of said power supply apparatus, wherein said artificial load controlling portion does not carry out connecting operation of said artificial load when the monitor has judged that the capacity of supplying power of said power supply apparatus is low.

* * * * *